(12) United States Patent
Lei et al.

(10) Patent No.: US 10,140,868 B1
(45) Date of Patent: Nov. 27, 2018

(54) V2V MESSAGING BASED ON ROAD TOPOLOGY

(71) Applicant: FORD GLOBAL TECHNOLOGIES, LLC, Dearborn, MI (US)

(72) Inventors: Oliver Lei, Windsor (CA); Allen R. Murray, Lake Orion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/685,581

(22) Filed: Aug. 24, 2017

(51) Int. Cl.
*G08G 1/16* (2006.01)
*G01S 5/00* (2006.01)
*B60K 31/00* (2006.01)
*G01S 13/93* (2006.01)

(52) U.S. Cl.
CPC ......... *G08G 1/163* (2013.01); *B60K 31/0008* (2013.01); *G01S 5/0072* (2013.01); *G01S 2013/936* (2013.01); *G01S 2205/002* (2013.01)

(58) Field of Classification Search
CPC ........ G08G 1/163; G08G 1/165; G08G 1/166; G08G 1/16; G08G 1/096741; B60Q 9/008; H04W 4/80; H04W 75/085

USPC .......................... 340/903, 905; 455/41.2, 345
See application file for complete search history.

(56) References Cited

U.S. PATENT DOCUMENTS

| 8,520,695 | B1* | 8/2013 | Rubin | G08G 9/02 |
| | | | | 370/445 |
| 9,725,037 | B2* | 8/2017 | Goudy | B60Q 9/008 |
| 9,935,710 | B2* | 4/2018 | Spaulding | G08G 1/163 |
| 2007/0054685 | A1* | 3/2007 | Kellum | G01S 13/931 |
| | | | | 455/517 |
| 2014/0067220 | A1* | 3/2014 | Seiler | B60T 7/12 |
| | | | | 701/70 |
| 2015/0296411 | A1 | 10/2015 | Meyer et al. | |
| 2016/0231746 | A1 | 8/2016 | Hazelton et al. | |

\* cited by examiner

*Primary Examiner* — Hung T Nguyen
(74) *Attorney, Agent, or Firm* — Jennifer M. Stec; Brooks Kushman P.C.

(57) ABSTRACT

A system includes a wireless transceiver and a processor. The processor is programmed to generate an alert message indicative of a roadway obstacle according to sensor data, send the alert message over vehicle-to-vehicle direct communications via the wireless transceiver, and send the alert message to a cellular tower via the wireless transceiver for local cellular broadcast responsive to topology data generated from the sensor data indicating line-of-sight communication is compromised.

16 Claims, 4 Drawing Sheets

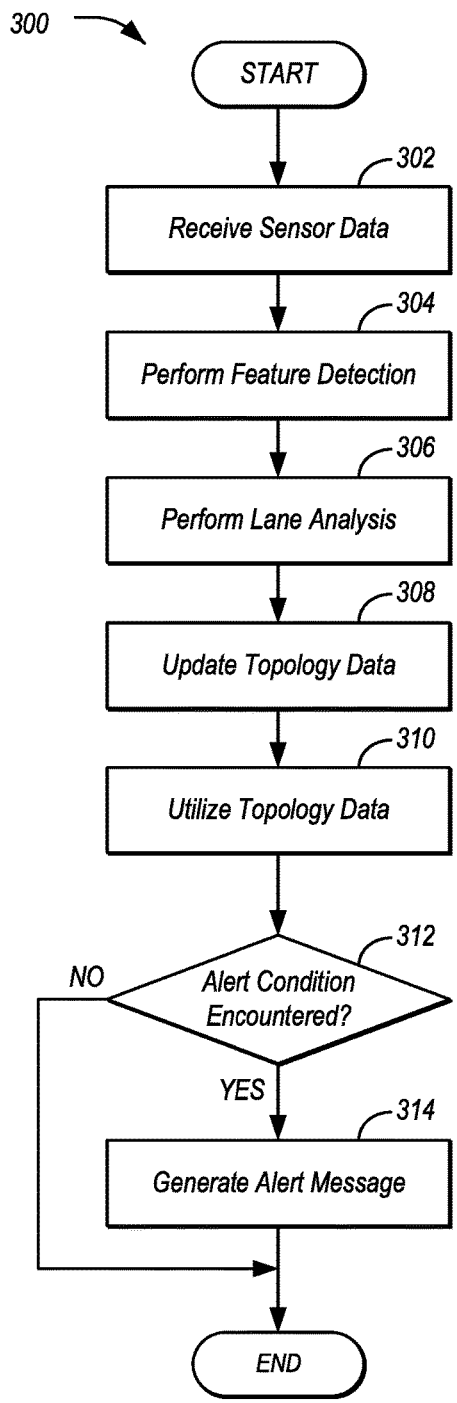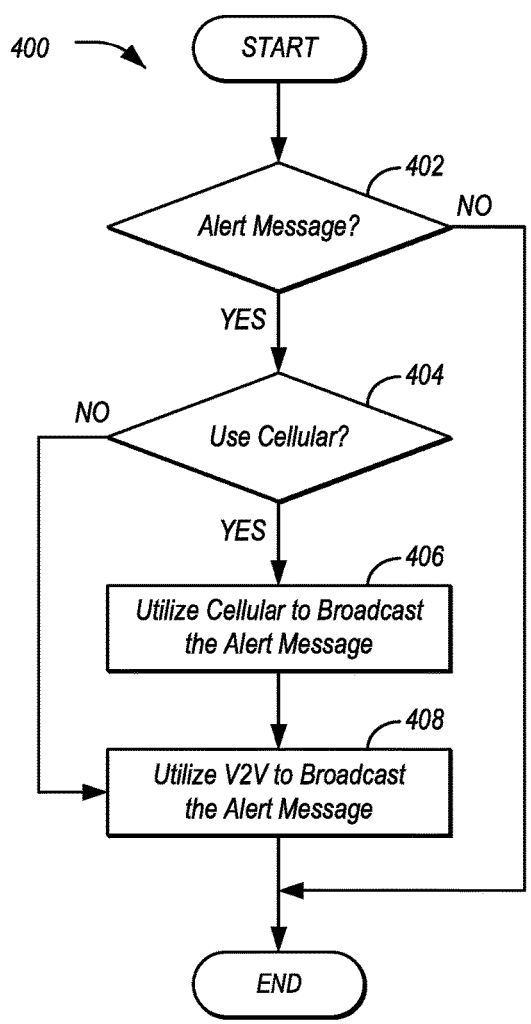
FIG. 3
FIG. 4

V2V MESSAGING BASED ON ROAD TOPOLOGY

TECHNICAL FIELD

Aspects of the disclosure generally relate to smart cellular vehicle-to-anything messaging based on road topology.

BACKGROUND

Vehicle-to-Vehicle (V2V) communications includes messages such as accident alerts or risky road surface warnings. These and other types of messages can be transmitted from a host vehicle to rear vehicles to inform them of the upcoming road conditions. Dedicated short range communications (DSRC) may be used for transmission of the messages.

SUMMARY

In one or more illustrative embodiments, a system includes a wireless transceiver; and a processor of a vehicle programmed to generate an alert message indicative of a roadway obstacle according to sensor data, send the alert message over vehicle-to-vehicle direct communications via the wireless transceiver, and send the alert message to a cellular tower via the wireless transceiver for local cellular broadcast responsive to topology data generated from the sensor data indicating line-of-sight communication is compromised.

In one or more illustrative embodiments, a method includes utilizing topology data to track vehicle location with respect to a lane for traversing a route along a roadway to a destination; sending an alert message indicative of a roadway obstacle over vehicle-to-vehicle direct communications; and sending the alert message to a cellular tower for local cellular broadcast responsive to topology data generated from vehicle sensor data indicating line-of-sight communication is compromised.

In one or more illustrative embodiments, a vehicle includes a processor programmed to send an alert message to a cellular tower for local cellular broadcast via a wireless transceiver configured to transmit over both vehicle-to-vehicle direct communications and cellular communications, responsive to topology data generated from vehicle sensor data indicating line-of-sight communication using the wireless transceiver is compromised.

BRIEF DESCRIPTION OF THE DRAWINGS

FIG. 3 illustrates an example process for generating alert messages; and

FIG. 4 illustrates an example process for providing alert messages to vehicles.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicle-to-Vehicle (V2V) communication technology may use line-of-sight transmission of messages at frequencies such as 5.9 gigahertz (GHz) for direct communication between vehicles. However, a shortcoming of using 5.9 GHz is severe signal loss in obstruction of trees, buildings, mountains, ramps, and other obstacles. As a result, messages may not be delivered as expected to the intended neighbor vehicles.

A vehicle may implement cellular-V2X technology in a single chipset capable of transmission of messages using either cellular protocols or via vehicle-to-vehicle (V2V) communication. A navigation system of the vehicle may be used to determine topology of a current road being traversed by the vehicle. Notably, cellular technology uses lower frequencies than V2V that may be more suitable for obstructed terrain. Accordingly, based on the road topology, cellular technology may be used for transmission of certain messages that may be unable to be received if V2V communication was used.

Figure 1:
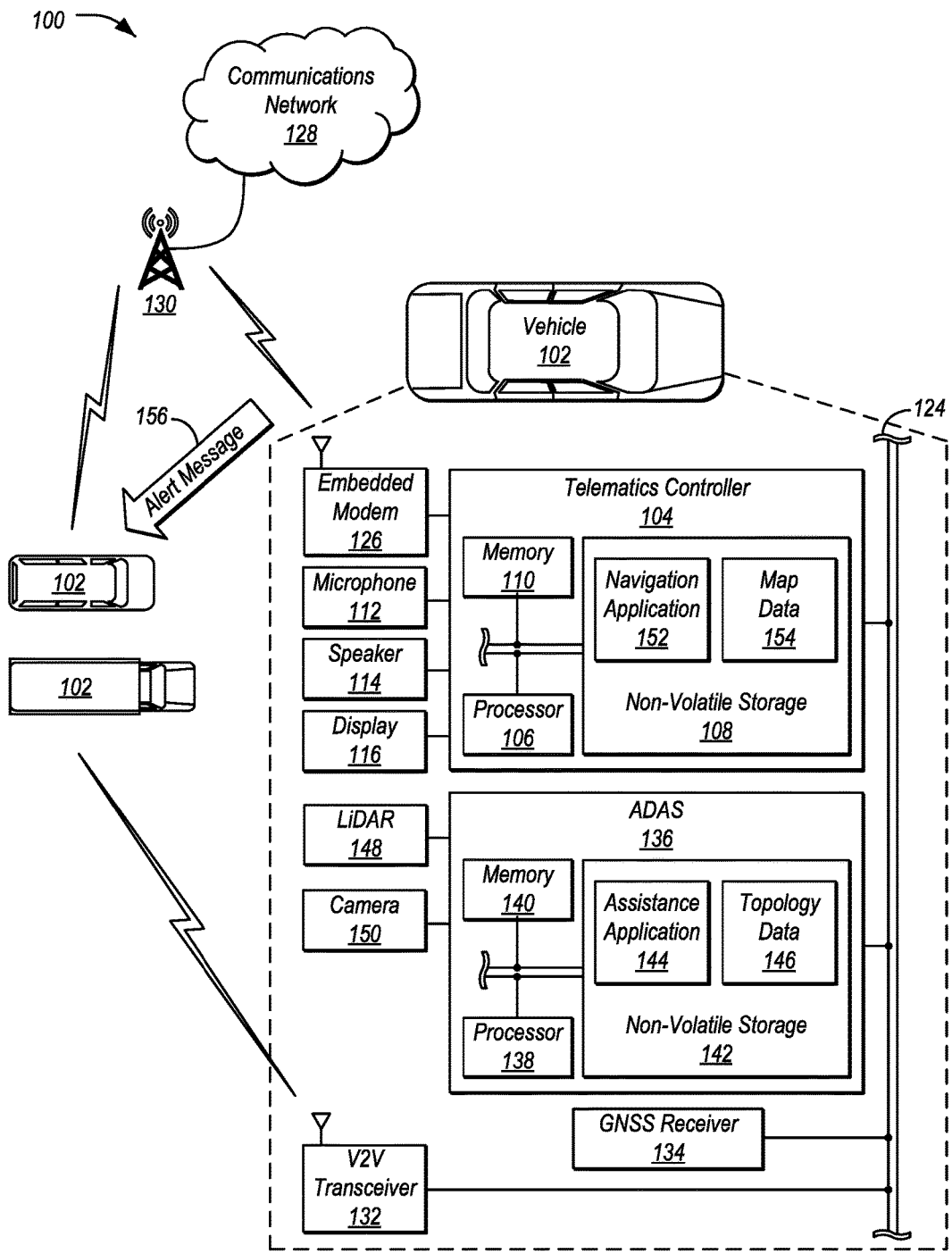
FIG. 1 illustrates an example system for V2X messaging.

FIG. 1 illustrates an example system 100 for V2X messaging. Using the system 100, vehicles 102 can perform wireless messaging using V2V and/or cellular communication. To facilitate the communications, the system 100 may utilize an assistance application 144 installed to an advanced driving assistance system (ADAS) 136 of the vehicle 102. When the assistance application 144 generates alert messages 156, the assistance application 144 may direct the ADAS 136 to send the alert messages 156 via cellular and/or V2V communications depending on the topology data 146 updated by the ADAS 136. Further aspects of the system 100 are described in detail below.

The vehicle 102 may be one of various types of passenger vehicles, such as a sedan, a crossover utility vehicle (CUV), a sport utility vehicle (SUV), a truck, a recreational vehicle (RV), or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electric vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, the vehicle 102 may be associated with a unique identifier, such as a vehicle identification number (VIN).

The telematics controller 104 may be configured to provide telematics services to the vehicle 102. These services may include, as some non-limiting possibilities, navigation, turn-by-turn directions, vehicle health reports, local business search, accident reporting, and hands-free calling. In an example, the telematics controller 104 may include the Ford SYNC system manufactured by The Ford Motor Company of Dearborn, Mich.

The telematics controller 104 may include one or more processors 106 configured to perform instructions, commands, and other routines in support of the processes described herein. Such instructions, and other data, may be maintained in a non-volatile manner using a variety of types of computer-readable storage medium 108. The data may be loaded from the storage medium 108 into a memory 110 to be accessed by the processor 106. The computer-readable storage medium 108 (also referred to as a processor-readable medium or storage) includes any non-transitory medium (e.g., a tangible medium) that participates in providing instructions or other data that may be read by the processor 106 of the telematics controller 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The telematics controller 104 may utilize a voice interface to provide a hands-free interface to the telematics controller 104. The voice interface may support speech recognition from audio received via the microphone 112 according to a grammar of available commands, and voice prompt generation for output via a speaker 114 or other audio output. In some cases, the system may be configured to temporarily mute, fade, or otherwise override an audio source specified by an input selector when an audio prompt is ready for presentation by the telematics controller 104 and music or other audio is selected for playback.

The telematics controller 104 may also receive input from human-machine interface (HMI) controls configured to provide for occupant interaction with the vehicle 102. For instance, the telematics controller 104 may interface with one or more buttons or other HMI controls configured to invoke telematics controller 104 functions (e.g., steering wheel audio buttons, a push-to-talk button, instrument panel controls, etc.). The telematics controller 104 may also drive or otherwise communicate with one or more displays 116 configured to provide visual output to vehicle occupants. In some cases, the display 116 may be a touch screen further configured to receive user touch input, while in other cases the display 116 may be a display only, without touch input capabilities.

The telematics controller 104 may also be configured to communicate with mobile devices 118 of the vehicle occupants. The mobile devices 118 may be any of various types of portable computing device, such as cellular phones, tablet computers, smart watches, laptop computers, portable music players, or other devices capable of communication with the telematics controller 104. In many examples, the telematics controller 104 may include a local wireless transceiver 120 (e.g., a BLUETOOTH module, a ZIGBEE transceiver, a Wi-Fi transceiver, etc.) configured to communicate with a compatible wireless transceiver of the mobile device 118. Additionally or alternately, the telematics controller 104 may communicate with the mobile device 118 over a wired connection, such as via a USB connection between the mobile device 118 and the telematics controller 104.

The vehicle bus 124 may include various methods of communication available between the telematics controller 104 and other components of the vehicle 102. For instance, the vehicle bus 124 may include one or more of a vehicle controller area network (CAN), an Ethernet network, and a media oriented system transfer (MOST) network.

The embedded modem 126 may be a component of the vehicle 102 configured to facilitate communication by the vehicle 102 over a communications network 128. The communications network 128 may provide communications services, such as packet-switched network services (e.g., Internet access, VoIP communication services), to devices connected to the communications network 128. An example of a communications network 128 may include a cellular telephone network. For instance, the embedded modem 126 may access the cellular network via connection to one or more cellular towers 130. To facilitate the communications over the communications network 128, the embedded modem 126 may be associated with unique device identifiers (e.g., mobile device numbers (MDNs), Internet protocol (IP) addresses, etc.) to identify the communications of the embedded modem 126 on the communications network as being associated with the vehicle 102. To support the telematics services, the telematics controller 104 may utilize the embedded modem 126 to facilitate networked communication between the vehicle 102 and devices external to the vehicle 102. In other examples, the telematics controller 104 may communicate with the communications network 128 via a network connection of a mobile device 118 connected to the telematics controller 104 via the local wireless transceiver 120.

The V2V transceiver 132 may be a component of the vehicle 102 configured to facilitate one-way or two-way wireless communication over frequencies and protocols specifically designed for automotive use. In an example, the V2V transceiver 132 may be configured to facilitate Intelligent Transportation System capabilities. V2V and its wireless component, wireless access in vehicular environments (WAVE) protocol, operate within a 75 megahertz (MHz) bandwidth of the 5.9 GHz frequency spectrum band. The allocated bandwidth is generally divided into one control channel (CCH) used to broadcast safety messages and announce available services and four to six service channels (SCHs) used for subsequent communication between the broadcasted service provider and a service user. It should be noted that while the V2V transceiver 132 and embedded modem 126 are illustrated herein as separate components, in some examples, the functionality of the V2V transceiver 132 and embedded modem 126 may be performed by a combined V2V/cellular transceiver device.

The global navigation satellite system (GNSS) receiver 134 may be a component of the vehicle 102 used to provide geo-spatial positioning information for the vehicle 102. As some examples, the GNSS receiver 134 may be configured to receive positional data via Global Positioning System (GPS), the GLObal NAvigation Satellite System (GLOASS), and/or the Galileo positioning system.

The ADAS 136 is configured to automate or enhance one or more vehicle systems to improve drivability. Example features implemented by the ADAS 136 to improve drivability may include adaptive cruise control, blind spot monitoring, crosswind stabilization, collision warning, and lane departure warning systems. In an example, the ADAS 136 may include one or more processors 138 configured to execute computer instructions, and a storage medium 142 on which the computer-executable instructions (e.g., assistance application 144 as discussed in more detail below) and/or data (e.g., topology data 146, etc.) may be maintained.

The ADAS 136 may receive input from various sensors. In an example, the ADAS 136 may be in communication with LiDar sensors 148. In other example, the ADAS 136 may additionally or alternately be in communication with laser, radar, sonar, or other types of distance and/or obstacle sensors. The ADAS 136 may be in communication with one or more camera 150 devices configured to capture information regarding the surroundings of the vehicle 102. The ADAS 136 may also receive in-car networking data from other vehicle controllers via the vehicle bus 124.

The navigation application 152 may be an application installed to the storage medium 108 of the telematics controller 104. When executed by the telematics controller 104, the navigation application 152 may be configured to identify a location of the vehicle 102 using the GNSS receiver 134, and utilize the location to provide navigation directions along a route. In some cases, the navigation directions may be provided to a vehicle occupant via the speaker 114 and/or display 116. In another example, the directions may be provided to the ADAS 136 or to fully autonomous driving systems to direct the vehicle 102.

For instance, the navigation application 152 may include instructions that, when executed by the processor 106 of the telematics controller 104, cause the telematics controller 104 to provide to the display 116 a map depicting the vehicle 102 in the context of the surrounding roads. The map may be based off map data 154 maintained to the storage 108 of the telematics controller 104. The map data 154 may include information that may be queried to provide map information to a viewer of the display 116. As one example, the telematics controller 104 may load the map data 154, as needed, off a digital versatile disk (DVD). As another example, the telematics controller 104 may maintain the map data 154 on flash or HDD storage. The map data 154 may include, for example, information regarding roads that may be traversed by the vehicle 102 (e.g., location, name, endpoints, speed limit, traffic, etc.), as well as geographic features of the area surrounding the roadway (e.g., water, parks, desert, mountains, building outlines, etc.).

The navigation application 122 may further include instructions to cause the telematics controller 104 to utilize the map data 154 to identify routes for the vehicle 102. As an example, the navigation application 125 may be configured to identify a path along the road segments of the map data 154 from a current vehicle 102 location (or user-specified start location) to a location the driver wishes to reach. The navigation application 152 may be further configured to display the route in the HMI of the vehicle 102, such as by way of a highlighted path overlaid on the displayed map data 154, and/or as a listing of one or more driving instructions that, when followed, take the vehicle 102 to the intended destination or waypoint point of interest (POI).

The assistance application 144 may include instructions that, when executed by the processor 138 of the ADAS 136, cause the ADAS 136 to process data received from the sensors (e.g., LiDAR 148, camera 150, etc.) and determine road topology according to the data. For instance, the assistance application 144 may perform feature detection on the received data to identify information relevant to lane locations or structure from sensor data. This information might include line markers in the roadway, painted features of the roadway, curbs, or street signs indicating road structure as some possibilities.

This road feature information may be interpreted by a lane analyzer, which attempts to fit the current identified information into a continuous representation of a lane based on prior received data. For instance, the tracking may include attempting to fit the identified information to a model of the roadway, such as a line, a curve, a parabola, or some other possible simple shape. A result of this processing may be topology data 146 that includes information indicative of the structure of the roadway ahead, such as lane positions and curving of the roadway.

In some cases, the assistance application 144 may detect an obstacle (e.g., a stalled vehicle 102) or steep curve or other feature that may be of interest to other vehicles 102 traversing the roadway. In such an example, the assistance application 144 may generate an alert message 156 to be sent to other vehicles 102 in the vicinity of the vehicle 102. The alert message 156 may include information such as vehicle direction, speed, and location. The alert message 156 may also include an alert type indicating a type of the alert message 156, such as presence of a stalled vehicle 102 or obstacle or steep curve, as some examples. As shown generally in FIG. 1, this communication may occur over cellular communication and/or via V2V.

Figure 2A:
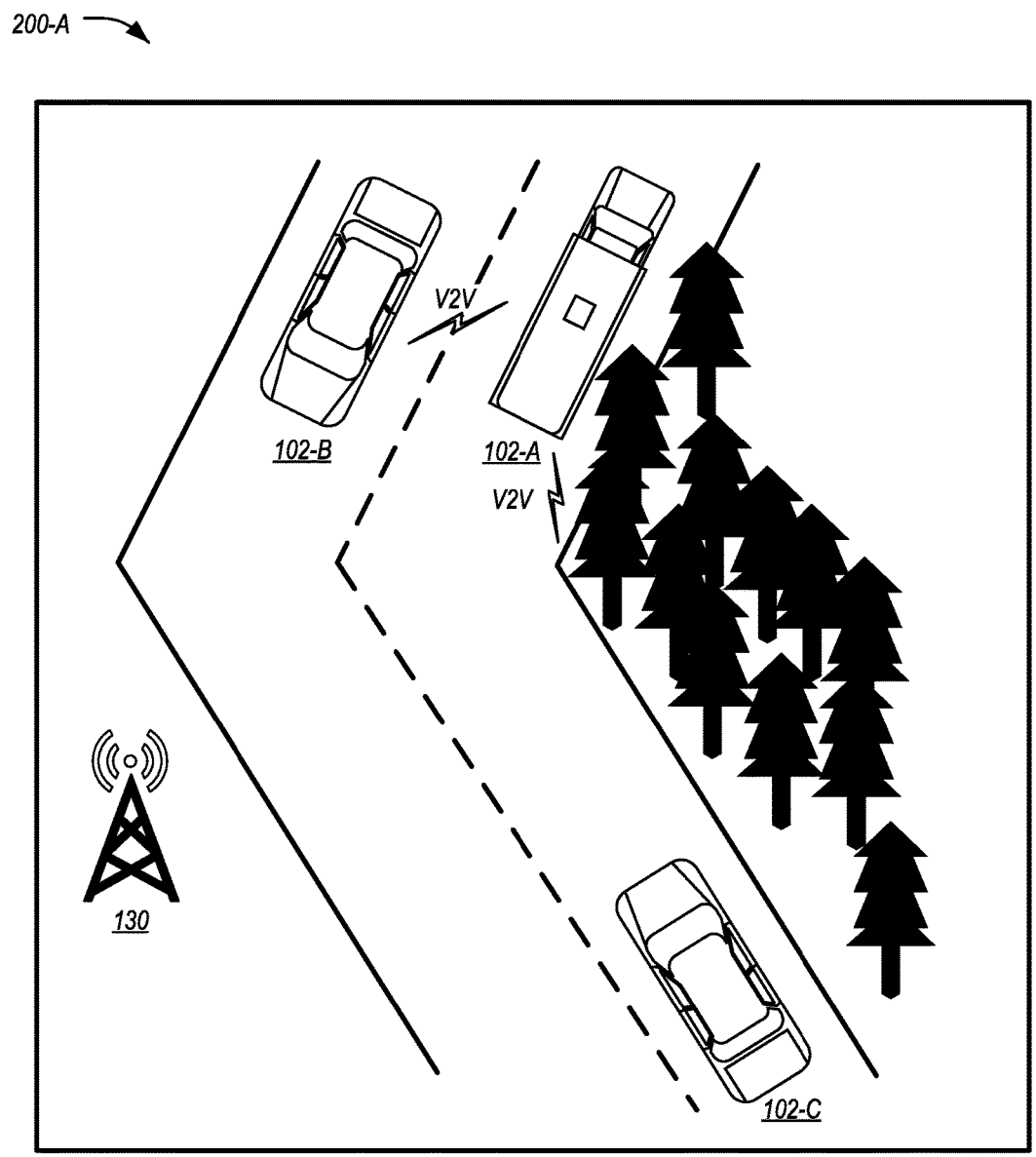
FIG. 2A illustrates an example diagram of a vehicle sending communications to other vehicles via V2V.

FIG. 2A illustrates an example diagram 200-A of a vehicle 102-A sending communications to other vehicles 102 via V2V. As shown, the vehicle 102-A sends an alert message 156 via V2V that is received by the vehicle 102-B. However, due to the structure of the terrain of the roadway in the example diagram 200-A, the vehicle 102-C is unable to receive the alert message 156 from the vehicle 102-A.

Figure 2B:
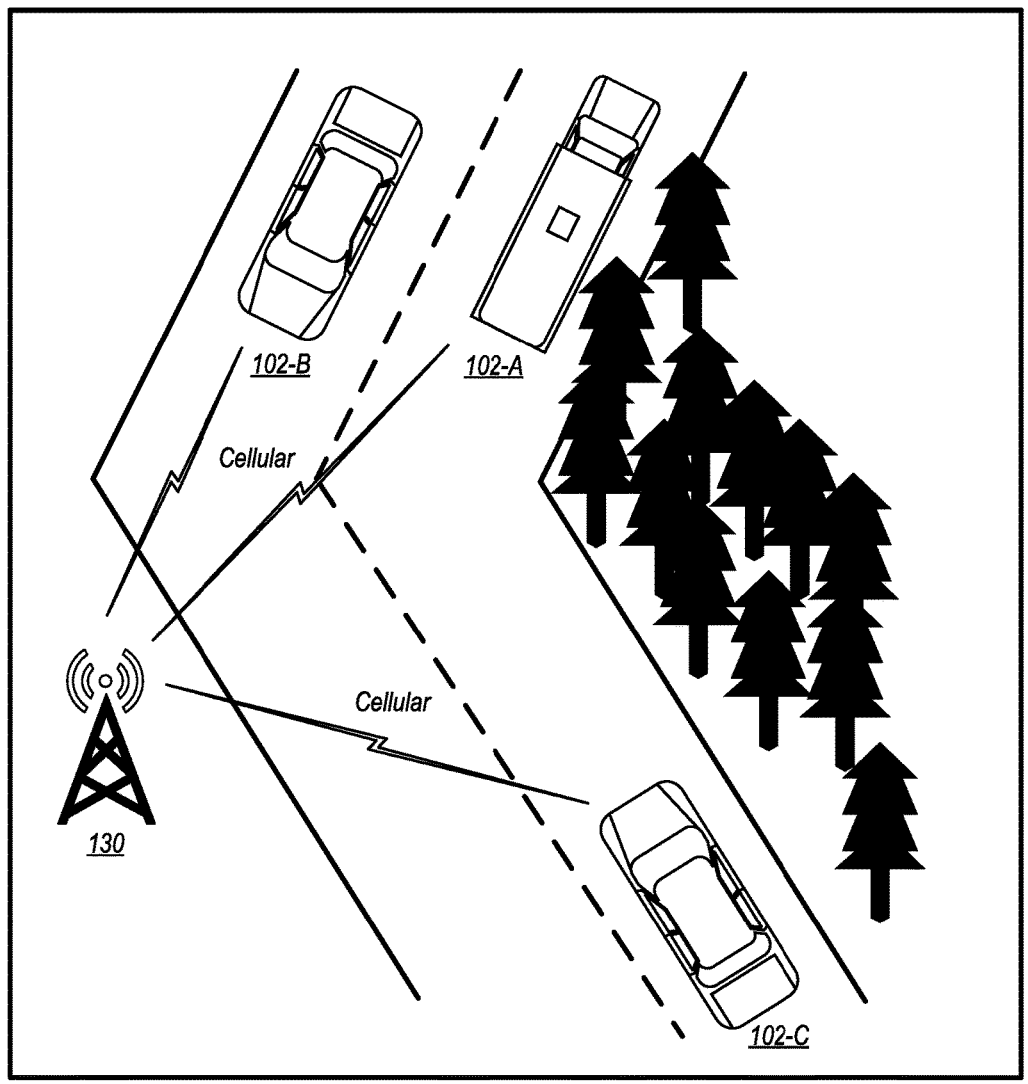
FIG. 2B illustrates an example diagram of a vehicle sending communications to other vehicles via cellular.

FIG. 2B illustrates an example diagram 200-B of a vehicle 102-A sending communications to other vehicles 102 via cellular. As shown, the vehicle 102-A sends an alert message 156 via a cellular channel to the cellular tower 130. The cellular tower 130 is located such that it provides cellular connectivity to the area of the illustrated roadway. Additionally, the cellular tower 130 may be further configured to relay alert messages 156 to its coverage area via the cellular connectivity provided by the cellular tower 130. For instance, rather than passing along the alert message to the communications network 128, the cellular tower 130 may verify that the message is an alert message 156 (e.g., and not a call, text message, data request, etc.), and if so, may rebroadcast the alert message 156 locally from the cellular tower 130 to any receivers within the coverage area of the cellular tower 130. A message may be verified as being an alert message 156 according to information in the message, such as the alert type being set. Thus, although the vehicle 102-C may be unable to receive V2V messages from the front vehicle 102-A directly, the vehicle 102-C can receive the alert messages 156 via cellular connectivity.

FIG. 3 illustrates an example process 300 for generating alert messages 156. In an example, the alert messages 156 may be generated by the ADAS 136. At 302, the ADAS 136 receives sensor data. For instance, the sensor data may include data from the LiDAR 148 sensors, data from the camera 150, and vehicle bus 124 data from various engine control units (ECU) of the vehicle 102. As some other possibilities, the ADAS 136 may receive sensor data from laser, radar, sonar, or other types of distance and/or obstacle sensors.

At 304, the ADAS 136 performs feature detection. In an example, the assistance application 144 of the ADAS 136 may identify information relevant to lane locations or structure from the received sensor data. This information may include identification of line markers in the roadway, identification of painted features of the roadway, curbs, or reads of street signs indicating road structure as some possibilities.

At operation 306, the ADAS 136 performs lane analysis. In an example, the assistance application 144 of the ADAS 136 fits the current identified information into a continuous representation of a lane based on prior received data. For instance, the tracking may include attempting to fit the identified information to a model of the roadway, such as a line, a curve, a parabola, or another roadway shape.

The ADAS 136 updates topology data 146 at operation 308. In an example, based on the lane analysis, the assistance application 144 creates topology data 146 that includes information indicative of the structure of the roadway ahead, such as lane positions and curving of the roadway.

At 310, the ADAS 136 utilizes the topology data 146. In an example, the assistance application 144 utilizes the topology data 146. In an example, the assistance application 144 may provide an alert to the user if the vehicle 102 drifts outside of the boundaries of a lane that the vehicle 102 is currently traversing. In another example, the assistance application 144 may provide commands to adjust the steering, speed, or other aspects of the travel of the vehicle 102 to correct the vehicle 102 motion if the vehicle 102 drifts outside of the boundaries of the lane. The assistance application 144 may also provide the topology data 146 to the navigation application 152 to allow the navigation application 152 to track the location of the vehicle 102 with respect to the proper lane for traversing a route to a destination. For instance, the assistance application 144 may utilize the topology data 146 to indicate to the user that the user should be in a different lane to properly continue along the route.

At operation 312, the ADAS 136 determines whether an alert condition is encountered. In an example, the assistance application 144 may detect an obstacle or steep curve or other feature that may be of interest to other vehicles 102 traversing the roadway. If so, control passes to operation 314. Otherwise, the process 300 ends. At 314, the ADAS 136 generates an alert message 156 to be sent to other vehicles 102 in the vicinity of the vehicle 102. In an example, this message may include an indication of the obstacle or curve or other alert condition that was identified. After operation 314, the process 300 ends.

FIG. 4 illustrates an example process 400 for providing alert messages 156 to vehicles 102. At 402, the ADAS 136 determines whether an alert message 156 is waiting. In an example, the ADAS 136 may identify whether any alert messages 156 have been generated as discussed above with respect to the process 300. If so, control passes to operation 404.

At 404, the ADAS 136 determines whether to utilize cellular connectivity to provide the alert message 156. In an example, the ADAS 136 may query the telematics controller 104 to receive an indication whether the embedded modem 126 has connectivity to a cellular tower 130. In another example, the ADAS 136 may additionally determine whether the topology data 146 for the current location of the vehicle 102 indicates an alert in a straightaway road segment or in a curved road segments, where line-of-sight communication such as V2V may be difficult. If cellular connectivity is available and road topology may constrict the ability of the vehicle 102 to effectively communicate via V2V, control passes to operation 406. Otherwise, control passes to operation 408.

At operation 406, the ADAS 136 utilizes cellular communication to broadcast the alert message 156. In an example, the ADAS 136 directs the embedded modem 126 to send the alert message 156. The cellular tower 130 may accordingly receive the alert message 156 and broadcast the alert message 156 to its coverage area via the cellular connectivity provided by the cellular tower 130.

At 408, the ADAS 136 utilizes V2V communication to broadcast the alert message 156. In an example, the ADAS 136 directs the V2V transceiver 132 to send the alert message 156. The V2V transceiver 132 may accordingly broadcast the alert message 156 to its coverage area via the V2V. After operation 408, the process 400 ends.

Computing devices described herein, such as the telematics controller 104 and ADAS 136, generally include computer-executable instructions where the instructions may be executable by one or more computing devices such as those listed above. Computer-executable instructions, such as those of the navigation application 152 and assistance application 144, may be compiled or interpreted from computer programs created using a variety of programming languages and/or technologies, including, without limitation, and either alone or in combination, Java™, C, C++, C#, Visual Basic, JavaScript, Python, JavaScript, Perl, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined not with reference to the above description, but with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A vehicle-to-vehicle communication system comprising:
   a wireless transceiver; and
   a processor of a vehicle programmed to
   perform lane analysis to fit, to a model of a roadway, information identified from performing feature detection on the sensor data to identify lane locations of the roadway and structures,
   send an alert message indicative of a roadway obstacle per the sensor data over vehicle-to-vehicle direct communications via the wireless transceiver, and
   send the alert message to a cellular tower via the wireless transceiver for local cellular broadcast responsive to topology data generated from the sensor data indicating line-of-sight communication is compromised.

2. The system of claim 1, further comprising LiDAR sensors and a camera configured to provide the sensor data.

3. The system of claim 1, wherein the roadway obstacle is a stalled vehicle.

4. The system of claim 1, wherein the alert message includes a direction, a speed, and a location of the vehicle.

5. The system of claim 1, wherein the model of the roadway includes one or more of a line, a curve, or a parabola.

6. A method of vehicle-to-vehicle communication executing by a processor comprising:
   utilizing topology data to track vehicle location with respect to a lane for traversing a route along a roadway to a destination;
   performing feature detection on sensor data to identify information including lane locations of the roadway and structures from the sensor data;
   performing lane analysis to fit the identified information to a model of the roadway;
   sending an alert message indicative of a roadway obstacle over vehicle-to-vehicle direct communications; and
   sending the alert message to a cellular tower for local cellular broadcast responsive to topology data generated from the sensor data indicating line-of-sight communication is compromised.

7. The method of claim 6, further comprising receiving sensor data from LiDAR sensors and cameras to generate the topology data.

8. The method of claim 6, wherein the roadway obstacle is a stalled vehicle.

9. The method of claim 6, wherein the alert message includes a direction, a speed, and a location of the vehicle.

10. The method of claim 6, wherein the model of the roadway includes one or more of a line, a curve, or a parabola.

11. The method of claim 6, wherein the sending over vehicle-to-vehicle direct communications and the sending to the cellular tower are performed using a wireless transceiver configured to transmit over both vehicle-to-vehicle direct communications and cellular communications.

12. A vehicle for vehicle-to-vehicle communication comprising:
   LiDAR sensors and a camera configured to provide sensor data for generating the alert message; and
   a processor programmed to
   perform feature detection on the sensor data to identify information including lane locations of a roadway and structures from the sensor data,
   perform lane analysis to fit the identified information to a model of the roadway, and
   send an alert message to a cellular tower for local cellular broadcast via a wireless transceiver configured to transmit over both vehicle-to-vehicle direct communications and cellular communications, responsive to topology data generated from vehicle sensor data indicating line-of-sight communication using the wireless transceiver is compromised.

13. The vehicle of claim 12, wherein the model of the roadway includes one or more of a line, a curve, or a parabola.

14. The vehicle of claim 12, wherein the alert message indicates a location of a stalled vehicle that is a roadway obstacle.

15. The vehicle of claim 12, wherein the alert message includes a direction, a speed, and a location of the vehicle.

16. A processor-executed method of vehicle-to-vehicle communication comprising:
   performing lane analysis to fit, to a model of a roadway, information identified from performing feature detection on the sensor data to identify lane locations of the roadway and structures; and
   sending an alert message, indicative of a roadway obstacle, over vehicle-to-vehicle direct communications, and responsive to topology data generated from the sensor data indicating line-of-sight communication is compromised, to a cellular tower for local cellular broadcast.

\* \* \* \* \*